(12) United States Patent
Kaufman

(10) Patent No.: US 8,983,055 B1
(45) Date of Patent: *Mar. 17, 2015

(54) QUALITY REVIEW OF CONTACTS BETWEEN CUSTOMERS AND CUSTOMER SERVICE AGENTS

(71) Applicant: Amazon Technologies, Inc., Reno, NV (US)

(72) Inventor: Donald L. Kaufman, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,219

(22) Filed: Aug. 6, 2013

Related U.S. Application Data

(63) Continuation of application No. 12/973,715, filed on Dec. 20, 2010, now Pat. No. 8,503,644.

(51) Int. Cl.
*H04M 3/00* (2006.01)
*G06Q 10/06* (2012.01)

(52) U.S. Cl.
CPC .............................. *G06Q 10/06398* (2013.01)
USPC ............. 379/265.06; 379/265.05; 379/265.07

(58) Field of Classification Search
CPC ........................... H04M 3/51; H04M 2203/40
USPC ................ 379/265.06, 265.05, 265.07, 266.1
See application file for complete search history.

(56) References Cited

U.S. PATENT DOCUMENTS

| | | | |
|---|---|---|---|
| 5,825,870 A | 10/1998 | Miloslavsky | |
| 6,389,132 B1 | 5/2002 | Price | |
| 6,408,066 B1 | 6/2002 | Andruska et al. | |
| 6,424,709 B1 | 7/2002 | Doyle et al. | |
| 6,487,290 B1 | 11/2002 | Le Grand | |
| 6,512,825 B1 | 1/2003 | Lindholm et al. | |

(Continued)

FOREIGN PATENT DOCUMENTS

| | | |
|---|---|---|
| JP | 10-262117 | 9/1998 |
| JP | 11-112666 | 4/1999 |

(Continued)

OTHER PUBLICATIONS

U.S. Appl. No. 13/620,441, filed Sep. 14, 2012, Brandwine et al.

(Continued)

*Primary Examiner* — Creighton Smith
(74) *Attorney, Agent, or Firm* — Knobbe Martens Olson & Bear, LLP

(57) ABSTRACT

A user of a personal computing device may identify an item of interest provided by a network-based service for which additional information is desired. Customer service agents (CSAs) of the network-based service may be contacted by the user to respond to queries. To assess the quality of a contact, a contact review service may record the contact between the CSA and the user and edit the contact to reduce its length for ease of review. The edited contact may be submitted to one or more reviewers to obtain reviews characterizing the contact quality. Reviewers may include CSAs not participating in the contact or other human reviewers. The reviewers may return their reviews to the contact review service, which generates a composite review from the returned reviews. The composite review may be employed for CSA evaluation and/or training purposes, amongst others.

25 Claims, 4 Drawing Sheets

(56) References Cited

U.S. PATENT DOCUMENTS

| | | |
|---|---|---|
| 6,731,393 B1 | 5/2004 | Currans et al. |
| 6,798,877 B2 | 9/2004 | Johnson et al. |
| 6,826,194 B1 | 11/2004 | Vered et al. |
| 7,085,366 B2 | 8/2006 | O'Neil |
| 7,092,509 B1 | 8/2006 | Mears et al. |
| 7,149,747 B1 | 12/2006 | Cheng et al. |
| 7,158,628 B2 | 1/2007 | McConnell et al. |
| 7,184,540 B2 | 2/2007 | Dezonno et al. |
| 7,581,230 B2 | 8/2009 | Chen et al. |
| 7,706,521 B2 | 4/2010 | Gavagni et al. |
| 7,949,999 B1 | 5/2011 | Willeford et al. |
| 7,958,518 B1 | 6/2011 | Willeford et al. |
| 8,046,309 B2 | 10/2011 | Evans et al. |
| 8,249,245 B2 | 8/2012 | Jay et al. |
| 8,340,275 B1 | 12/2012 | Brandwine et al. |
| 8,503,664 B1 | 8/2013 | Kaufman |
| 8,542,816 B2 | 9/2013 | Kaufman et al. |
| 8,600,035 B2 | 12/2013 | Jay et al. |
| 8,666,929 B2 | 3/2014 | Jaffer et al. |
| 8,848,898 B2 | 9/2014 | Jay et al. |
| 8,873,735 B1 | 10/2014 | Brandwine et al. |
| 8,879,717 B2 | 11/2014 | Jay et al. |
| 2001/0014143 A1 | 8/2001 | Kuhn |
| 2001/0054064 A1 | 12/2001 | Kannan |
| 2002/0196927 A1 | 12/2002 | Johnson et al. |
| 2003/0169870 A1 | 9/2003 | Stanford |
| 2003/0220866 A1 | 11/2003 | Pisaris-Henderson et al. |
| 2004/0186778 A1 | 9/2004 | Margiloff et al. |
| 2005/0111653 A1 | 5/2005 | Joyce et al. |
| 2006/0143058 A1 | 6/2006 | Brunet et al. |
| 2006/0198504 A1 | 9/2006 | Shemisa et al. |
| 2006/0203993 A1 | 9/2006 | Busey et al. |
| 2007/0160188 A1 | 7/2007 | Sharpe et al. |
| 2007/0201684 A1 | 8/2007 | Boghani |
| 2007/0208590 A1 | 9/2007 | Dorricott et al. |
| 2007/0286180 A1 | 12/2007 | Marquette et al. |
| 2008/0034354 A1 | 2/2008 | Brughton et al. |
| 2008/0082341 A1 | 4/2008 | Blair |
| 2008/0084989 A1 | 4/2008 | Dhanakshirur |
| 2008/0147470 A1 | 6/2008 | Johri et al. |
| 2008/0247525 A1 | 10/2008 | LeBlanc et al. |
| 2008/0288349 A1 | 11/2008 | Weisberg et al. |
| 2009/0154688 A1 | 6/2009 | Jay et al. |
| 2009/0156178 A1 | 6/2009 | Elsey et al. |
| 2009/0228493 A1 | 9/2009 | Kephart et al. |
| 2009/0261157 A1 | 10/2009 | Kumar et al. |
| 2009/0316687 A1 | 12/2009 | Kruppa |
| 2010/0131382 A1 | 5/2010 | Fitzsimmons |
| 2010/0281398 A1 | 11/2010 | Melideo |
| 2011/0051920 A1 | 3/2011 | Dashe et al. |
| 2011/0066498 A1 | 3/2011 | Wojcicki et al. |
| 2011/0087548 A1 | 4/2011 | Schauser et al. |
| 2011/0286444 A1 | 11/2011 | Petrovykh |
| 2011/0310891 A1 | 12/2011 | Howe et al. |
| 2011/0320200 A1 | 12/2011 | Broman et al. |
| 2012/0101865 A1 | 4/2012 | Zhakov |
| 2014/0074529 A1 | 3/2014 | Jay et al. |

FOREIGN PATENT DOCUMENTS

| | | |
|---|---|---|
| JP | 2002-033834 | 1/2002 |
| JP | 2002-57801 | 2/2002 |
| JP | 2002-108794 | 4/2002 |
| JP | 2002-314691 | 10/2002 |
| JP | 2003-022382 | 1/2003 |
| JP | 2003-87411 | 3/2003 |
| JP | 2003-122890 | 4/2003 |
| JP | 2004-343220 | 12/2004 |
| JP | 2007-265325 | 10/2007 |
| JP | 2008-172487 | 7/2008 |
| JP | 2008-182353 | 8/2008 |
| WO | WO 98/01987 | 1/1998 |

OTHER PUBLICATIONS

Japanese Office Action, Re JP Application No. 2014-001969, dated Oct. 14, 2014.

QUALITY REVIEW OF CONTACTS BETWEEN CUSTOMERS AND CUSTOMER SERVICE AGENTS

CROSS-REFERENCE TO RELATED APPLICATIONS

The present application is a continuation of U.S. application Ser. No. 12/973,715, filed Dec. 20, 2010, now U.S. Pat. No. 8,503,644, which is incorporated by reference in its entirety.

BACKGROUND

Data networks are increasingly employed by users to perform a variety of tasks formerly performed in person. For example, a user may purchase an item from a network-based retailer using his or her computing device. In yet another example, the user may employ a banking service to check account balances, pay bills, schedule transfers, and the like. In this manner, providers of network-based services may conduct a number of pre- and post-sale contacts with the users (i.e., their customers).

In order to help the users employ these services, many network-based retailers have provided service agents that may be contacted by telephone to assist users. Systems, such as call centers, have been further developed as centralized, scalable mechanisms to handle the volume of user calls received.

With these call centers in place, it is desirable to the network-based retailers that their service agents provide good service to users. To that end, improved mechanisms for assessing the quality of calls between users and service agents (e.g., user satisfaction with a call) are desired to determine to quantify the performance of service agents.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
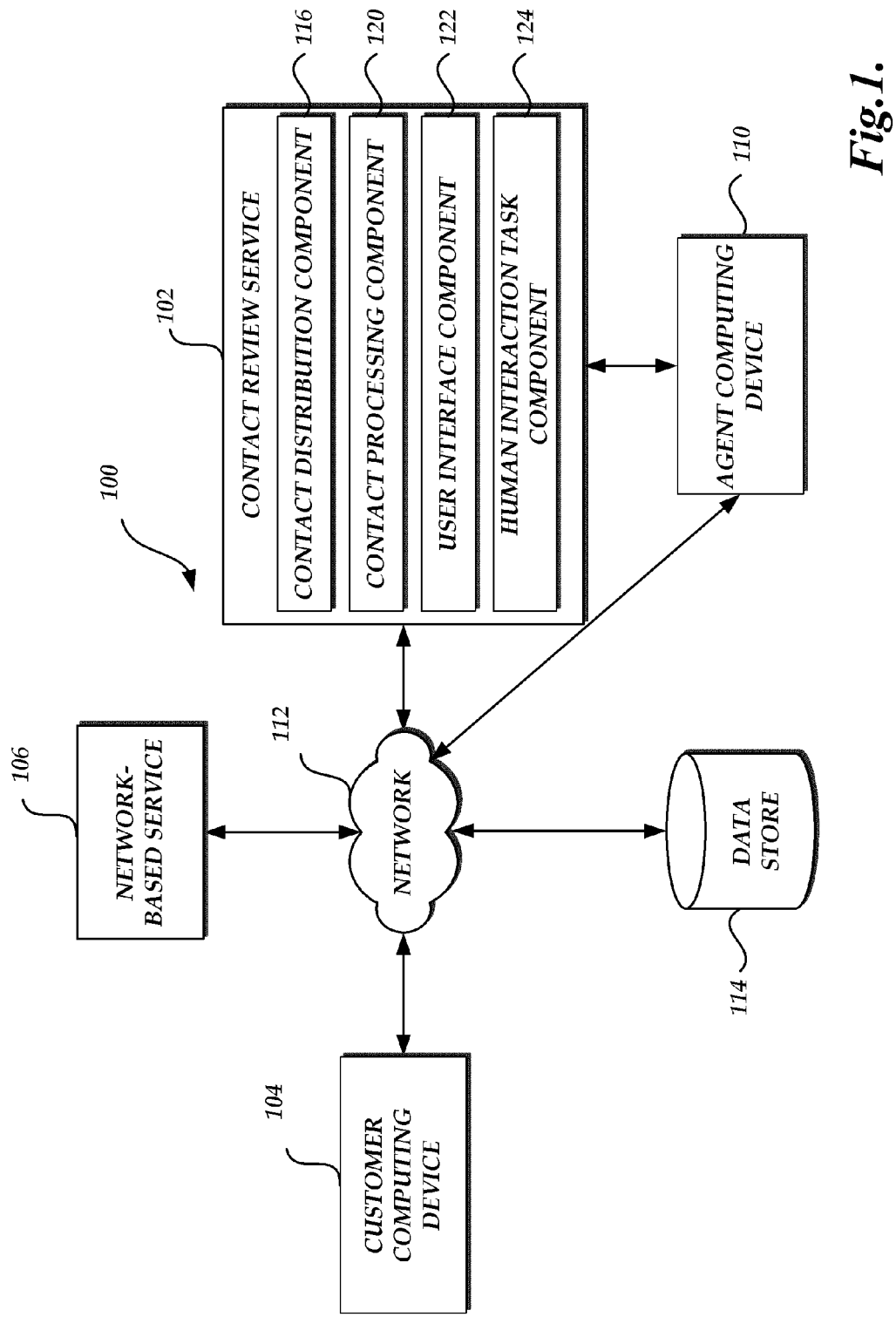
FIG. 1 is a schematic block diagram of an illustrative call quality review service for assessing the quality of contacts between customers and customer service agents.

Aspects of the present disclosure relate to reviewing contacts between service agents of network-based services (e.g., websites) and users of the network-based services for quality. Contacts may include any communication between users and service agents. In this context, the quality of a contact may refer to the service agent's success in addressing the user's concerns and/or a perceived level of the user's satisfaction with the contact. Embodiments discussed below may refer to the users as customers and the service agents as customer service agents (CSAs). However, it may be understood that users are not limited to customers but may include any users of network-based services.

In this regard, a contact review service is described that enables assessment of the quality of a contact between a customer and a CSA. For example, a customer using a customer computing device, such as a personal computer, may identify an item of interest presented by a network-based service and may desire to communicate with a CSA regarding the item of interest. This network-based service may be anything that provides a good, service, or information that is of interest to the customer. Accordingly, the network-based service may include network-based retailers, such as those which sell items for purchase to the customer, network-based sources of entertainment and/or information (e.g., network-based encyclopedias, media sharing, etc), network-based social networking services which enable users to share content with one another, and the like.

In one embodiment, the network-based retailer may provide a mechanism by which the customer may contact a CSA. Contacts may be conducted by communication mechanisms including, but not limited to, telephone, voice-over IP (VOIP), video conferencing, instant messaging (IM), short message service (SMS) text messaging, and other communications protocols known in the art. As described in greater detail below, when the customer employs such a contact mechanism to contact a CSA, the contact review service may distribute the contact to an available CSA and record the content of the contact between the customer and the CSA.

For example, the network-based service may be a network-based retail service, implemented via a website, e.g., a website that sells music and videos. Using a personal computing device, the customer may identify an item of interest displayed for sale by the network-based retail service, for example, an audio CD. In addition to identifying the item of interest, the customer may also have one or more questions regarding purchase of the CD, such as the return policy of the network-based service. The network-based service may provide a telephone number for contacting the network-based service. When the customer places a telephone call to a CSA, a voice recording of both the customer and the CSA may be made by the contact review service.

In order to facilitate quality review of the recorded contact, the contact review service may subject the recorded contact to pre-review processing. The pre-review processing is designed to produce an edited, recorded contact that includes less content than the original recorded contact. In one aspect, the recorded contact may be edited to focus on the customer's portion of the contact. In another aspect, the recorded contact may be edited focus only on a portion of the total contact (e.g., sample the contact). In further embodiments, the recorded content may be edited to remove any sensitive or private information regarding the customer, such as names, credit card information, address, social security number, and the like. Thus, it may be easier for a reviewer to determine the quality of the contact from the edited, recorded contact than the original recorded contact.

Continuing the example of a customer call regarding a CD, the audio recording of the customer speaking with the CSA may be edited during pre-review processing. In one example, the voice of the CSA may be removed from the call, leaving the customer's speech. In another example, at least a portion of the blank space that remains within the call may be removed. In one instance, this blank space may include the blank space created by the previous removal of the voice of the CSA. In another instance this blank space may include at least a portion of pauses between the customer's words, such as at least a portion of long pauses (e.g., pauses longer than a second), may be removed. In a further embodiment, the recorded content may be edited to remove any sensitive or private information regarding the customer, such as names, credit card information, addresses, social security numbers, and the like. In an additional example, a selected duration of the remaining audio recording (e.g., the last 15 to 20 seconds of the duration of the audio recording) may be sampled. The audio recording edited in this manner may be stored for later review.

The contact review service may subsequently transmit the edited audio recording to a reviewer for quality review. In one embodiment, the reviewer may be a CSA. In this case, the contact review service may identify one or more on-duty CSAs that did not participate in the contact under review and are not presently conducting a contact with a customer. The contact review service may select one or more of these available CSAs and transmit the edited, recorded contact to the selected CSAs.

In an alternative embodiment, the reviewer may include a human worker of a human interaction task component. The human interaction task component may employ human workers to obtain selected information in response to a given input. In this case, the contact review service may provide the human interaction task component with the edited, recorded contact and instructions for a selected number of human workers to review the contact.

The contact review service may further generate and transmit a user interface to the reviewer. The reviewer may employ this user interface with his or her computing device to facilitate quality review of the edited, recorded contact. For example, the user interface may enable the reviewer to review the recorded contact, rate the contact, and, optionally, request additional information regarding the recorded contact, amongst other functions.

If the customer appeared to be satisfied from the sample, the reviewer may employ the user interface to indicate that the contact quality was good. If the customer did not appear to be satisfied from the sample, the reviewer may employ the user interface to indicate that the contact quality was bad. If the reviewer is unable to determine the customer's disposition after reviewing the sample, the reviewer may indicate that the contact quality was indeterminate. Alternatively, if the reviewer is unable to determine the customer's disposition after reviewing the sample, the reviewer may request additional information regarding the contact, such as a longer sample or a sample from another location within the contact. It may be understood that, in alternative embodiments, the contact may be rated on a numerical scale or be rated using other ratings schemes known in the art.

For example, assume that the reviewer includes a selected number of CSAs. The edited, recorded audio recording discussed above may be provided to one or more CSAs (e.g., 3), along with the graphical user interface, when the selected CSAs are not busy with other duties. The CSAs may listen to the sampled portions of the edited call and enter his or her review in the provided user interface. For example, the CSAs may be prompted by the user interface to provide an assessment of whether the customer was satisfied and/or whether the CSA handled a difficult situation well (a good call) or the customer was dissatisfied and/or the CSA did not handle the call well (a bad call). A selected scale, such as a numerical scale (e.g., 1 to 5, 1 to 10) or a binary scale (e.g., positive/negative), may be employed by the reviewer when making their review.

Optionally, as discussed in greater detail below, should a CSA require more information to provide a review, the CSA may request more information through the user interface. In response to the request, the contact review service may provide a version of the edited call that is modified to include more of the call (e.g., the last 30 seconds of the call as compared to the last 15 seconds). In certain embodiments, the CSA may choose, through the user interface, the additional information provided by the contact review service.

The ratings generated by the reviewers may be returned to the contact review service for further analysis. Analysis may include aggregating the reviews of the respective reviewer and generating a composite review. The composite review may be associated with the CSA participating in the call to evaluate the performance of the participating CSA. The composite review may be further employed to characterize the contact for training purposes.

For example, continuing the example above, the contact review service may receive reviews from three CSAs. Assume that a binary positive/negative scale is employed to rate the call and the reviewers return two positive reviews and one negative review. As the majority of the reviews are positive, the contact review service may determine the aggregate review of the call to be positive.

Beneficially, reviewing contacts that are edited and sampled significantly improves the contact review process. In one aspect, traditional contact review has focused primarily upon customer surveys. However, these surveys are dependent upon obtaining customer responses, which can be both time consuming and expensive. In contrast, embodiments of the disclosed contact review service are not reliant upon customer feedback in a traditional sense, reducing this cost. Instead, the customer's feedback is taken from their contact with a CSA.

With reference to FIG. 1, an embodiment of an operating environment 100 for quality review of contacts between customers and customer service agents (CSAs) is illustrated. In the operating environment 100, a customer may employ his or her customer computing device 104 to communicate with a network-based service 106 implemented via a website. The network-based service 106 may maintain or generate one or more user interfaces capable of display by the customer computing device 104. Should the customer have a problem or query regarding information displayed in one or more of the user interfaces provided by the network-based service 106, the customer, employing his or her customer computing device 104 may make contact with a CSA employing his or her agent computing device 110.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components (including but not limited to virtual utility computing services, a.k.a. "cloud computing services") and peer-to-peer network configurations to implement at least a portion of the processes.

The contact review service 102 and network-based service 106 may each be embodied in a plurality of components, each executing an instance of the respective contact review service 102 and network-based service 106. A server or other computing component implementing the contact review service 102 and network-based service 106 may include a network interface, memory, processing unit, and computer readable medium drive, all of which may communicate which each other may way of a communication bus. The network interface may provide connectivity over a network 112 and/or other networks or computer systems. The processing unit may communicate to and from memory containing program instructions that the processing unit executes in order to operate the contact review service 102 and network-based service 106. The memory generally includes RAM, ROM, and/or other persistent and auxiliary memory.

Those skilled in the art will appreciate that the network 112 may be any wired network, wireless network, or combination thereof. In addition, the network 112 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and, thus, need not be described in more detail herein.

The customer computing device 104 and agent computing device 110 may include any communication device, such as a PC, a kiosk, a thin client, a home computer, and a dedicated or embedded machine. Further examples may include laptop or tablet computers, personal computers, personal digital assistants (PDAs), hybrid PDAs/mobile phones, mobile phones, electronic book readers, set-top boxes, and the like.

With further reference to FIG. 1, illustrative components of the contact review service 102 will now be addressed. In an embodiment, the contact review service 102 includes a contact distribution component 116 for receiving a contact request from a customer for contact with a CSA (e.g., a call from a customer) to place the customer in contact with an available CSA (e.g., route the customer call to an available agent phone).

The contact distribution component 116 may be in communication with one or more CSAs, as represented by agent computing device 110. In an embodiment, a CSA may employ his or her agent computing device 110 to notify the contact distribution component 116 of times when the CSA is available for duty. In other embodiments, the contact distribution component 116 may maintain a schedule of available CSAs. Embodiments of the contact distribution component 116 may be found in U.S. patent application Ser. No. 12/192,067, filed on Aug. 14, 2008, entitled, "SYSTEM AND METHOD FOR AUTOMATED CALL DISTRIBUTION" and U.S. patent application Ser. No. 12/192,064, filed Aug. 14, 2010, entitled, "INDEPENDENT CUSTOMER SERVICE AGENTS," the entirety of each of which are hereby incorporated by reference.

Contact requests may take any form, depending upon the type of communication mechanisms that are provided to contact the CSA. In one embodiment, a customer may call a CSA using a traditional POTS or voice-over-IP service. In another embodiment, a customer may employ a messaging service, such as instant messaging, text messaging, and electronic mail, to contact the CSA. In another embodiment, a customer may employ video conferencing to contact the CSA. In a further embodiment, the customer may contact the CSA through a website (e.g., the network-based service 106). Examples of such a contact may be found in U.S. patent application Ser. No. 12/547,370, filed on Aug. 25, 2009, entitled, "SYSTEMS AND METHODS FOR CUSTOMER CONTACT" and U.S. patent application Ser. No. 12/547,387, filed on Aug. 25, 2009, entitled, "SYSTEMS AND METHODS FOR CUSTOMER CONTACT," the entirety of each of which is hereby incorporated by reference in their entirety.

During the course of the contact, a contact processing component 120 of the contact review service 102 may further record the contact between the CSA and the customer for quality assessment. Contacts received by the contact review service 102 may be stored in one or more data stores, represented by data store 114. It may be understood that data store 114 may include network-based storage capable of communicating with any component of the system 100 via network 112. The data store 114 may further include storage that is in local communication with any component of the system 100.

Upon completion of the contact between the CSA and the customer, contact processing component 120 may further process the recorded contact prior to quality review. In one embodiment, the recorded contact may be edited to substantially remove content from the CSA. For example, in the case of a contact that is a call, at least a portion of the voice of the CSA may be removed from the edited contact. In the case of a contact that is an instant message conversation, at least a portion of the text of the CSA may be removed from the edited contact. In another embodiment, the recorded contact may be edited by the contact processing component 120 to remove delays in the customer's portion of the contact. For example, in the case of a call, long pauses between words spoken by the customer (e.g., pauses due to the removal of the CSA's portion of contact or pauses in speech by the customer), white noise, or other durations of silence may be removed from the edited contact.

In a further embodiment, the contact processing component 120 may sample a portion of the edited contact. Sampling may include taking a selected portion of the edited contact for further use in the contact review process. By employing a sample, rather than the entire contact, the reviewer is not required to listen to the entire edited contact. Sampling durations may be varied, as necessary. In one embodiment, a sample may be approximately 15 to 30 seconds. In one embodiment, sampling may include taking a portion of the contact of at the end. Taking a portion of the contact at the contact end may be beneficial, as the final disposition of the customer may be readily apparent and the reviewer may easily assign a review to the contact. In other embodiments, sampling may include other portions of the contact, such as a portion of the contact at the beginning or in the middle of the contact.

As discussed in greater detail below, when the reviewer finds it difficult to make a review determination, the reviewer may request additional information regarding the contact. In this case, the contact processing component 120 may sample additional parts of the contact. For example, the contact processing component 120 may sample a portion of the contact contiguous with the portion of the contact already sampled. In another example, the contact processing component 120 may sample a portion of the contact that is different that the portion of the contact already sampled. For example, if an end portion of the contact has been previously sampled, a beginning portion of the contact may be additionally sampled in response to the reviewer request.

The edited and sampled contact may be stored in the data store 114 until the contact is selected for review by the contact processing component 120. In an embodiment, contacts may be selected for review in the order in which it they are recorded by the contact processing component 120. In another embodiment, contacts may be selected for review based upon performance evaluations of CSAs. That is to say, contacts that are conducted by CSAs pending review may be selected ahead of contacts that are not conducted by CSAs pending review. Other mechanisms for selecting contacts for review may additionally be employed without limit.

After identifying the contact to be reviewed, the contact processing component 120 may select one or more reviewers to review the contact. In one embodiment, the reviewer may include one or more CSAs. In this case, the contact processing component 120 may query the contact distribution component 116 to identify one or more CSAs that are available to conduct contact reviews (e.g., CSAs that the contact distribution component 116 knows to be on duty and are not presently in contact with a customer). To preserve the integrity of the review process, in certain embodiments, a CSA that participated in the contact under review may be eliminated from consideration for review of that same contact. The contact processing component 120 may further select at least one of these available CSAs and transmit the edited, sampled contact to the selected CSAs for review.

In an alternative embodiment, the reviewer may include a human worker of a human interaction task component 124. Embodiments of the human interaction task component 124 are described in U.S. patent application Ser. No. 12/200,822, filed Aug. 28, 2008, entitled, "ENHANCING AND STORING DATA FOR RECALL AND USE" and Ser. No. 12/623,354, filed Nov. 20, 2009, entitled "ENHANCING AND STORING DATA FOR RECALL AND USE USING USER FEEDBACK," each of which are incorporated by reference in their entirety. Generally described, the human interaction task component 124 may include a collection of human workers that are tasked with responding to questions that are relatively faster, easier, and/or more cost effective to answer using a human respondent rather than a computing device. Therefore, a human worker of the human interaction task component 124 may receive the edited, sampled contact and be requested to provide a review to the contact processing component 120.

A user interface component 122 of the contact review service 102 may also generate a user interface for transmission with the edited, sampled contact that facilitates the reviewer's review of the edited, sampled contact. In alternative embodiments, the user interface may be transmitted to the reviewer before or after transmission of the edited, sampled contact. As discussed in greater detail below, the user interface may enable the reviewer to examine the edited, sampled contact (e.g., audio, text, video, etc.), such as pause, play, fast-forward, and rewind. The user interface may further enable the reviewer to request additional information regarding the edited, sampled contact (e.g., a longer sample and/or a sample from a different portion of the contact). The user interface may further enable the reviewer to submit a review of the edited, sampled contact to the contact processing component 120.

Reviews may employ any review scheme as understood in the art. In one embodiment, the review scheme may include a binary scheme in which the reviewer provides a positive or negative response (e.g., good review or bad review). In another embodiment, the review scheme may include a numerical scheme in which the reviewer provides a numerical value provides a number within selected limits (e.g., 1 to 10, where 1 is worst and 10 is best).

The contact processing component 120 may further collect the reviews generated by the reviewers and generate an aggregate review based upon the received reviews. In one embodiment, where the review scheme is binary, the response receiving the majority of reviewer responses may be determined by the contact processing component 120 to be the aggregate review. In another embodiment, where the review scheme is numerical, the contact processing component 120 may employ an average of the received reviews to determine the aggregate review. The aggregate reviews may subsequently be stored in the data store 114 for subsequent use in evaluating the performance of the CSA participating the in the contact and/or for training purposes.

Figure 2:
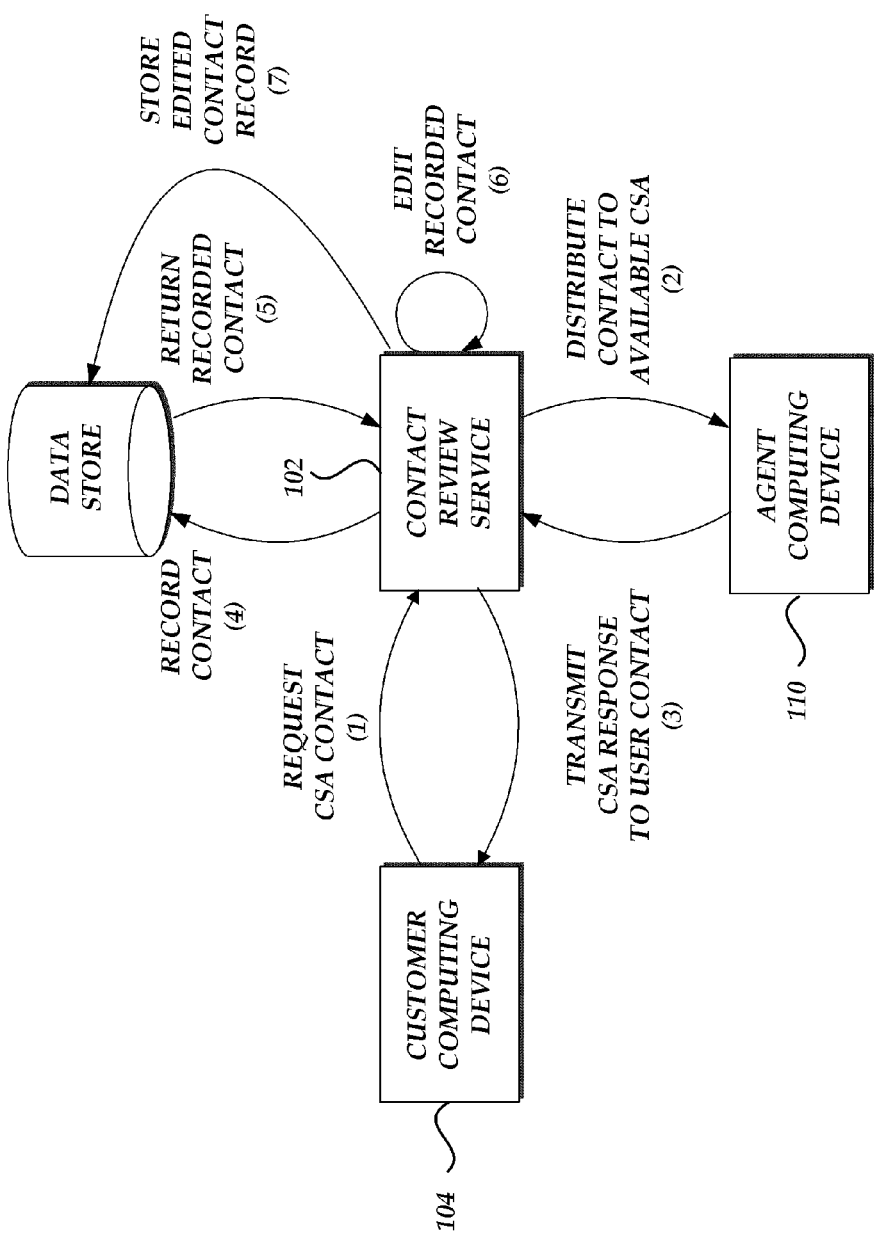
FIG. 2 is a block diagram of the operating environment of FIG. 1, illustrating the contact review service recording and processing a call between a customer and customer service agent.

FIG. 2 is a block diagram of the operating environment of FIG. 1, illustrating a customer contact distributed to an available CSA and recorded by the contact review service 102. As depicted in FIG. 2, the customer may submit a request for contact with a CSA using his or her customer computing device 104. The request may be the act of attempting to contact the CSA. For example, in the case where the customer employs a telephone to contact the CSA, the request may be calling the number associated with the CSA.

The request from the customer may be transmitted to the contact review service 102. The contact review service 102 identifies an available CSA and directs the customer into contact with the identified, available CSA. As discussed above, the contact review service 102 may maintain real-time records of CSA availability such that, when a customer request for contact with a CSA is received, the contact review service 102 may be able to determine whether a CSA is immediately available or whether the customer will be required to wait for a CSA to become available.

The contact review service 102 may further record the content. As discussed above, the content may include any mechanism of communication, including but not limited to, telephone calls, voice-over IP (VOIP) calls, video conferencing, instant messaging (IM), short message service (SMS) text messaging, and other communications protocols known in the art. Recordation of the contact may take place concurrently with the contact or after completion of the contact.

The recorded contact may also be edited at the time of recordation or at a later time and stored. In certain embodiments, editing may reduce the amount of total content within the contact and further isolate the customer's contribution to the contact. In this manner, subsequent review of the edited contact may be less time consuming and more focused on the role of the customer.

Figure 3:
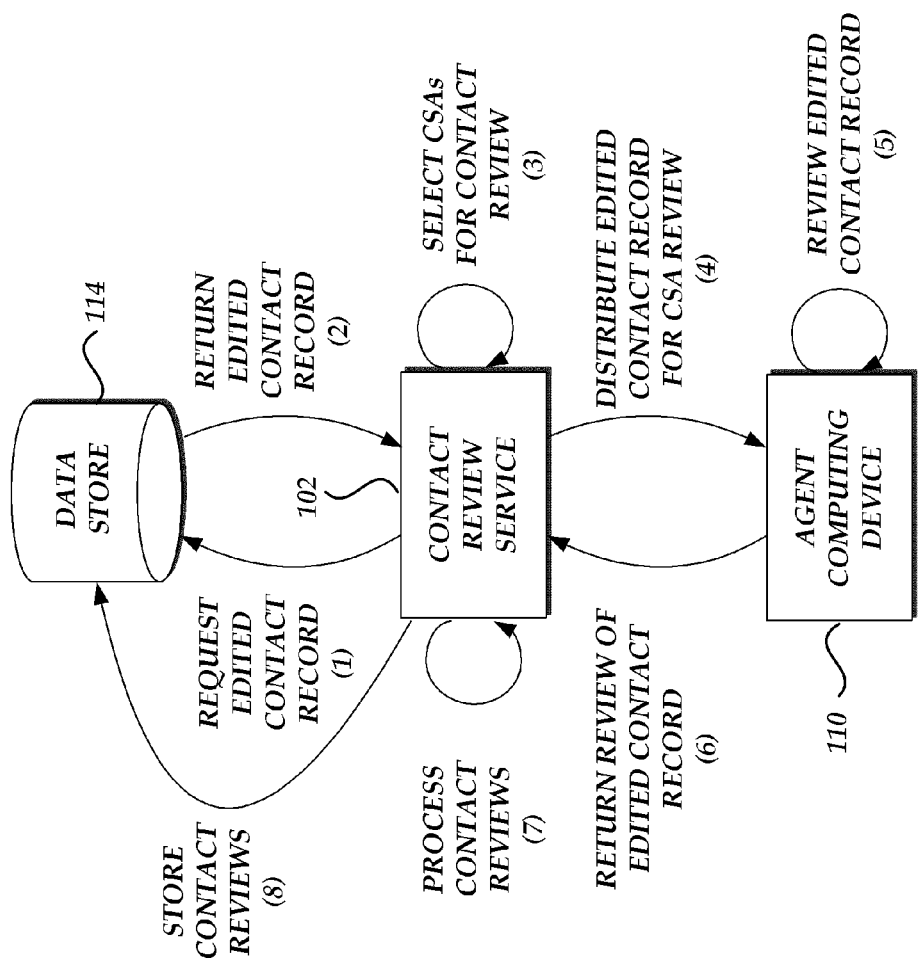
FIG. 3 is a block diagram of the operating environment of FIG. 1, illustrating the contact review service processing and distributing the recorded call between the customer and customer service agent to one or more other customer service agents for quality review.

FIG. 3 is a block diagram of the operating environment of FIG. 1, illustrating review of an edited contact by a CSA. It may be understood, however, that in an alternative embodiment, the contact review service 102 may distribute the edited contact record to one or more human workers of the human interaction task component 124 instead of a CSA. The contact review service 102 requests a selected, edited contact record from the data store 114. A variety of selection criteria may be employed for use selecting the contact record. In certain embodiments, the selection may be made at random. In other embodiments, the selection may be made in chronological order, with the oldest contact records selected first. In further embodiments, the selection may be made based upon the CSA, where contacts that include participation by a CSA that will be undergoing training or evaluation within the near future may be reviewed in advance of other contacts.

Upon receipt of the edited contact record, the contact review service 102 may select one or more CSAs for review of the edited contact. CSAs may be selected using a number of criteria. In one embodiment, a CSA may be selected at random. In another embodiment, a CSA may be selected based upon seniority and/or experience. In a further embodiment, a CSA may not be selected should that CSA have participated in the contact under consideration. It may be understood, however, that the CSA selection may be performed in advance of the contact selection in alternative embodiments.

Figure 4:
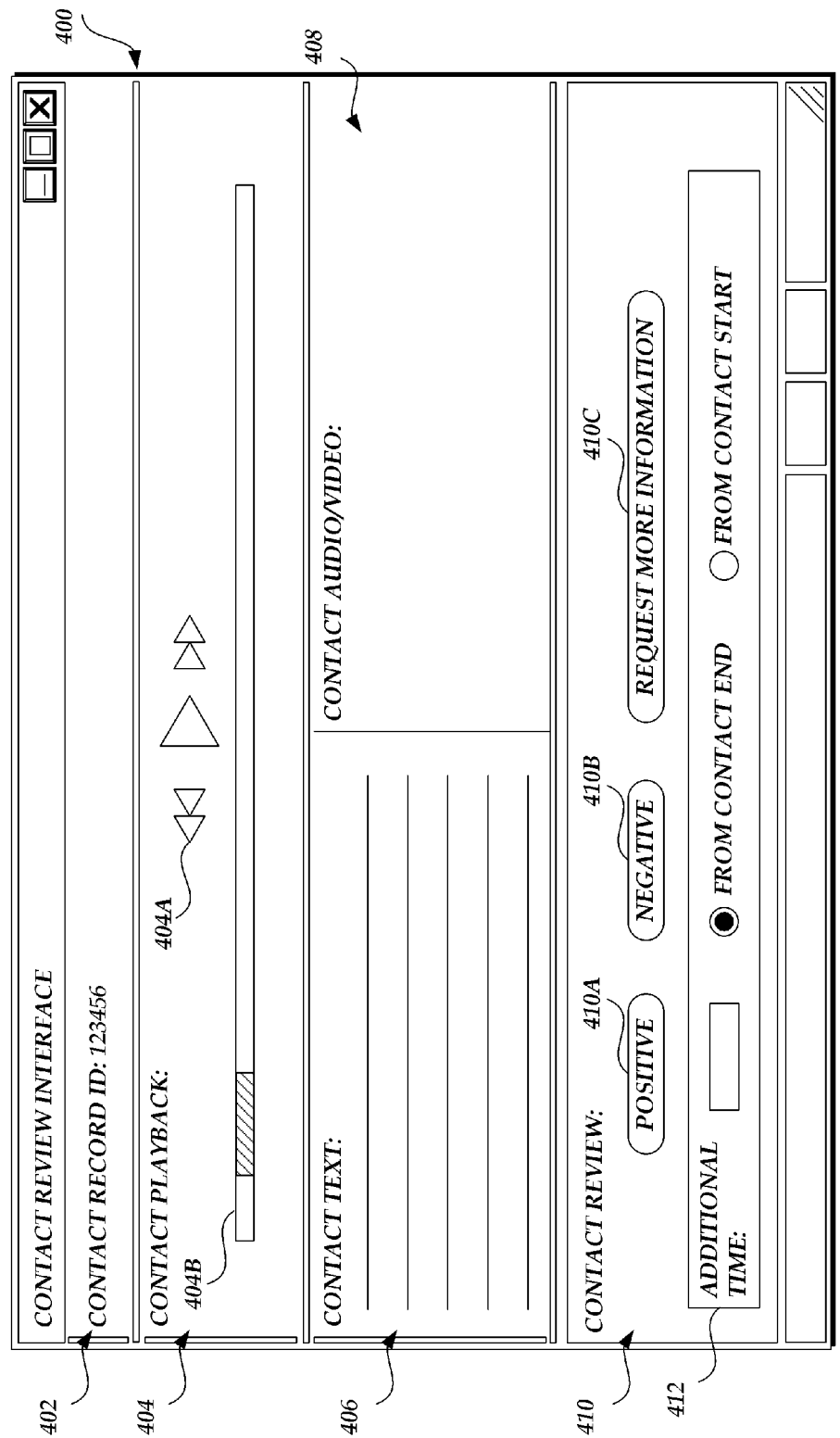
FIG. 4 is an illustrative user interface for display on a reviewer's computing device that facilitates contact quality review.

Following selection of the edited contact and the one or more CSAs, the edited contact may be transmitted to the CSAs for review. As discussed above, a contact quality user interface 400 that facilitates review of the edited contact may also be transmitted to the CSAs before, during, or after transmission of the edited contact. An embodiment of the contact review user interface 400 is illustrated in FIG. 4.

The user interface 400 may include a contact record identification number 402, media control window 404, media windows 406, 408, and contact review window 410. The contact record identification number 402 may be employed for use in uniquely identifying the edited contact amongst others.

The media control window 404 may provide user interface objects 404A and 404B for controlling the playback of edited contact. For example, edited contacts including telephone and VOIP calls and video may all benefit from the ability to precisely control the playback of such media. For example, user interface objects 404A may enable start, stop, fast-forward, and rewind of the contact playback. User interface objects 404B may include a progress bar indicating the time of the edited contact file at which the reviewer is presently located. The user interface objects 404B may be further employed to move the media playback to a desired point within the total sampled duration of the edited contact.

Instant messaging, text messaging, electronic mail messages, and other written forms of contact may be displayed in media window 406. In certain embodiments, the contact review service 102 may perform speech to text conversion on audio contacts (e.g., calls) and/or the audio portions of video conferencing contacts and display the edited contact within the media window 406. In certain embodiments, written forms of the contact may be displayed in the media window 406 even if they are redundant with other audio or visual media displayed in media window 408.

The reviewer, after reviewing the edited contact, may enter their review in the contact review window 410. In an embodiment illustrated in FIG. 4, the reviewer may select from review options that are binary (e.g., user interface objects 410A (positive) or 410B (negative)). As discussed above, however, other review options may be employed without limit in the contact review window 410, such as numerical scales (e.g., 1 to 5, 1 to 10).

Should the reviewer be unable to make a review based upon the received contact, a request for more information may be made by selection of user interface object 410C. Selection of user interface object 410C may request a selected amount of additional time to be sampled from the contact record. Furthermore, the reviewer may select where the additional time comes from, such as the contact end, the contact beginning, or a selected location therebetween.

With reference again to FIG. 3, a review entered by the reviewer in the user interface 400 may be transmitted to the contact review service 102. In further embodiments, the contact review service 102 may provide the edited contact to multiple CSAs for review. While not all CSAs may respond, it is anticipated that a fraction of the total potential respondents will return a response. Therefore, multiple reviews may be received for a single edited contact.

The contact review service 102 may subsequently generate a final review for the contact under review based upon at least a portion of the received reviews. The manner in which this final review is generated may depend upon the review options. For example, in the binary review option scheme illustrated in FIG. 4, the final review may be a majority of the received reviews. In the case of a numerical review option scheme, the final review may be an average of the received reviews.

All of the processes described herein may be embodied in, and fully automated via software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware, or a combination thereof.

Conditional language such as, among others, "can," "could," "might," or "may," unless specifically stated otherwise, are otherwise understood within the context as used in general to convey that certain embodiments include, while other embodiments do not include certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable storage medium having computer-executable instructions encoded thereon, wherein the instructions, when executed by a computing apparatus, cause the computing apparatus to:
   obtain a record of a contact between a customer and a customer service agent; and
   provide to a reviewer:
      at least a portion of the record of the contact between the customer and the customer service agent, and
      a user interface configured to enable the reviewer to provide a review of the contact between the customer and the customer service agent,
   wherein the reviewer is neither the customer nor the customer service agent.

2. The non-transitory computer-readable storage medium of claim 1, wherein the instructions further cause the computing apparatus to isolate at least a portion of a contribution of the customer to the record of the contact.

3. The non-transitory computer-readable storage medium of claim 2, wherein the instructions further cause the computing apparatus to isolate at least the portion of the contribution of the customer to the record of the contact by selecting a portion of the record of the contact near an end region of the record of the contact.

4. The non-transitory computer-readable storage medium of claim 1, wherein the user interface is further configured to request the reviewer to characterize a satisfaction of the customer with the customer service agent using a predetermined scale.

5. The non-transitory computer-readable storage medium of claim 1, wherein the reviewer comprises a human worker of a human interaction task component.

6. The non-transitory computer-readable storage medium of claim 1, wherein the record of the contact between the customer and the customer service agent comprises one or more of telephone calls, electronic mail messages, short message service (SMS) messages, instant messages, and video messages.

7. The non-transitory computer-readable storage medium of claim 1, wherein the user interface is further configured to enable the reviewer to request additional information regarding the contact.

8. The non-transitory computer-readable storage medium of claim 7, wherein the instructions further cause the computing apparatus to provide to the reviewer an additional portion of the record of the contact in response to the request for additional information.

9. A contact review service comprising:
a data store that stores one or more records of contacts between a first person and a second person; and
a computing device in communication with the data store, wherein the computing device is operative to:
obtain a record of contact between the first person and the second person from the data store; and
provide to a reviewer:
at least a portion of the record of contact between the first person and the second person, and
a user interface configured to enable the reviewer to provide a review of the contact between the first person and the second person,
wherein the reviewer is neither the first person nor the second person.

10. The contact review service of claim 9, wherein the computing device is further operative to generate the portion of the record of contact by isolating at least a portion of a first person contribution to the record of contact.

11. The contact review service of claim 10, wherein isolating the record of contact comprises selecting a portion of the record of contact near an end region of the record of contact.

12. The contact review service of claim 9, wherein the user interface is further configured to request the reviewer to characterize a satisfaction of the first person with the second person.

13. The contact review service of claim 9, wherein the reviewer is a human worker of a human interaction task component.

14. The contact review service of claim 9, wherein the user interface is further configured to enable the reviewer to request additional information regarding the contact.

15. The contact review service of claim 14, wherein the computing device is further operative to provide to the reviewer an additional portion of the record of contact in response to the request for additional information.

16. The contact review service of claim 9, wherein the record of contact between the first person and the second person comprises one or more of telephone calls, electronic mail messages, short message service (SMS) messages, instant messages, and video messages.

17. The contact review service of claim 9, wherein the computing device is further operative to provide the portion of the record of contact and the user interface to the reviewer when the review is not busy.

18. The contact review service of claim 9, wherein the reviewer is a customer service agent.

19. A computer-implemented method of determining a quality of contact between a first person and a second person, the method comprising:
under control of one or more configured computer systems,
obtaining a record of a contact between a first person and a second person; and
providing to a reviewer:
at least a portion of the record of the contact between the first person and the second person, and
a user interface configured to enable the reviewer to provide a review of the contact between the first person and the second person,
wherein the reviewer is neither the first person nor the second person.

20. The computer-implemented method of claim 19, further comprising generating the portion of the record of the contact by isolating an end region of the record of the contact.

21. The computer-implemented method of claim 19, further comprising providing to the reviewer a scale for the reviewer to use to assess a quality of the contact between the first person and the second person.

22. The computer-implemented method of claim 19, wherein the reviewer comprises a human worker of a human interaction task component.

23. The computer-implemented method of claim 19, wherein the contact between the first person and second person comprises one or more of telephone calls, electronic mail messages, short message service (SMS) messages, instant messages, and video messages.

24. The computer-implemented method of claim 19, further comprising receiving a request from the reviewer for additional information regarding the contact.

25. The computer-implemented method of claim 24, further comprising providing to the reviewer an additional portion of the record of the contact in response to the request for additional information.

* * * * *